US007910149B2

(12) United States Patent
Jensen et al.

(10) Patent No.: US 7,910,149 B2
(45) Date of Patent: Mar. 22, 2011

(54) LIQUID BREAD IMPROVER, THE USE AND THE PROCESS FOR PRODUCING THEREOF

(75) Inventors: Erik Jensen, Tranbjerg J (DK); Erik Keller, Hornslet (DK)

(73) Assignee: Danisco A/S, Copenhagen (DK)

( * ) Notice: Subject to any disclaimer, the term of this patent is extended or adjusted under 35 U.S.C. 154(b) by 174 days.

(21) Appl. No.: 10/838,533

(22) Filed: May 5, 2004

(65) Prior Publication Data

US 2005/0031763 A1 Feb. 10, 2005

Related U.S. Application Data

(63) Continuation-in-part of application No. PCT/EP02/12227, filed on Nov. 1, 2002.

(30) Foreign Application Priority Data

Nov. 5, 2001 (FI) .................................. 20012151

(51) Int. Cl.
*A23D 9/06* (2006.01)
(52) U.S. Cl. ........ 426/653; 426/601; 426/604; 426/650; 426/654
(58) Field of Classification Search .................... None
See application file for complete search history.

(56) References Cited

U.S. PATENT DOCUMENTS

| | | | |
|---|---|---|---|
| 2,170,518 A | 8/1939 | Musher | |
| 2,236,516 A | 4/1941 | Cahn et al. | |
| 2,913,342 A | 11/1959 | Cameron et al. | |
| 3,295,986 A | 1/1967 | Saslaw et al. | |
| 3,595,674 A | 7/1971 | Shaffer et al. | |
| 3,698,917 A | 10/1972 | Baum et al. | |
| 3,796,814 A | 3/1974 | Cermak | |
| 3,895,117 A | 7/1975 | Backlund | |
| 3,914,439 A | 10/1975 | Graves | |
| 3,943,259 A | 3/1976 | Norris | |
| 4,016,337 A | 4/1977 | Hsu | |
| 4,137,338 A | 1/1979 | Gawrilow | |
| 4,163,066 A | 7/1979 | Mason et al. | |
| 4,226,894 A | 10/1980 | Gawrilow | |
| 4,254,356 A | 3/1981 | Karikas | |
| 4,275,081 A | 6/1981 | Coleman et al. | |
| 4,335,157 A | 6/1982 | Varvil | |
| 4,343,823 A | 8/1982 | Todd, Jr. et al. | |
| 4,385,076 A | 5/1983 | Crosby | |
| 4,391,838 A | 7/1983 | Pate | |
| 4,477,479 A | 10/1984 | Jervis | |
| 4,698,264 A | 10/1987 | Steinke | |
| 4,704,288 A | 11/1987 | Tsau et al. | |
| 4,707,367 A | 11/1987 | Miller et al. | |
| 4,752,485 A | 6/1988 | Sharma et al. | |
| 4,786,502 A | 11/1988 | Chapura et al. | |
| 4,804,548 A | 2/1989 | Sharma et al. | |
| 4,873,194 A | 10/1989 | Sawamura et al. | |
| 4,904,485 A | 2/1990 | Hirakawa et al. | |
| 5,013,574 A | 5/1991 | Hassel | |
| 5,064,669 A | 11/1991 | Tan et al. | |
| 5,084,293 A | 1/1992 | Todd, Jr. | |
| 5,094,860 A | 3/1992 | Newhall et al. | |
| 5,106,639 A | 4/1992 | Lee et al. | |
| 5,114,929 A | 5/1992 | Vartan | |
| 5,126,151 A | 6/1992 | Bodor et al. | |
| 5,153,013 A | 10/1992 | Suyama et al. | |
| 5,185,173 A | 2/1993 | Bethke et al. | |
| 5,314,707 A | 5/1994 | Kester et al. | |
| 5,399,371 A | 3/1995 | Harris | |
| 5,443,759 A | 8/1995 | Dahms | |
| 5,536,519 A | 7/1996 | Graf et al. | |
| 5,607,708 A | 3/1997 | Fraser et al. | |
| 5,654,029 A | 8/1997 | Heeringa et al. | |
| 5,681,601 A | 10/1997 | Hendrick et al. | |
| 5,733,594 A | 3/1998 | Hirose et al. | |
| 5,895,675 A | 4/1999 | Carment et al. | |
| 6,291,005 B1 | 9/2001 | Fuchs et al. | |
| 6,387,433 B1 * | 5/2002 | Widlak | .................. 426/606 |
| 6,524,637 B2 * | 2/2003 | Vogensen et al. | .................. 426/601 |

FOREIGN PATENT DOCUMENTS

| | | |
|---|---|---|
| DE | 291 240 A5 | 6/1991 |
| DE | 20001106 U1 | 4/2000 |
| EP | 0 021 483 A1 | 1/1981 |
| EP | 0 063 835 A2 | 11/1982 |
| EP | 0 165 720 A1 | 12/1985 |
| EP | 2 570 388 | 3/1986 |
| EP | 0 246 554 A2 | 5/1987 |
| EP | 0 246 554 B1 | 5/1987 |
| EP | 0 421 510 A1 | 4/1991 |
| EP | 0421510 A | 4/1991 |
| EP | 0572051 A1 | 12/1993 |
| EP | 0 664 677 | 9/1996 |
| EP | 0 572 051 B1 | 5/1997 |
| EP | 0 775 444 A1 | 5/1997 |
| EP | 1 063 895 B1 | 10/2003 |
| FR | 2698761 A1 | 6/1994 |
| GB | 1 376 870 | 12/1974 |
| GB | 1 544 499 | 4/1979 |
| GB | 1 572 761 | 8/1980 |
| GB | 2 208 079 A | 2/1989 |
| JP | 61-31039 A | 2/1986 |
| WO | WO 94/08470 | 4/1994 |
| WO | WO 96/13980 | 5/1996 |
| WO | WO 98/47356 | 10/1998 |
| WO | WO 98/47386 A1 | 10/1998 |

(Continued)

OTHER PUBLICATIONS

Martinez and Speckman, J. Dairy Sci. 1988, 71:893-900.

(Continued)

*Primary Examiner* — Lien Tran
(74) *Attorney, Agent, or Firm* — Vedder Price, P.C.; Thomas J. Kowalski; Eugenia Kiselgof

(57) ABSTRACT

The present invention relates to a water-free low viscous liquid bread improver, which comprises a liquid emulsifier based on esters of hydroxy polycarboxylic acid derivatives, a glyceride based stabilizer and additive(s) and less than about 20% oil, to the use thereof, and to a process for producing a liquid bread improver. The liquid bread improver according to the present invention may be used in, for example, a variety of products in the bakery industry or in extruded snacks.

15 Claims, No Drawings

FOREIGN PATENT DOCUMENTS

| | | |
|---|---|---|
| WO | WO 99/48377 A1 | 9/1999 |
| WO | WO 01/11974 A1 | 2/2001 |
| WO | WO 01/70036 A1 | 9/2001 |

OTHER PUBLICATIONS

Dialog File 351, Accession No. 3672585, Derwent WPI English language abstract for FR 2 570 388, cited as document AN5.

Dialog File 351, Accession No. 4213942, Derwent WPI English language abstract for EP 0 246 554 A2 and EP 0 246 554 B1, cited as document AO5.

Patent Abstracts of Japan, English language abstract of JP 61-31039 A, document AM3.

Dialog File 351, Accession No. 883667, Derwent WPI English language abstract of DD 291 240 A5, document AP3.

Dialog File 351, Accession No. 9942921, Derwent WPI English language abstract for FR 9214571.

Dialog File 351, WPI Accession No. 2000-247671, Derwent WPI English Abstract for DE 20001106.

Communication of a Notice of Opposition, Application No. 02774763.3, dated Oct. 15, 2009.

Response to Opposition Against EP 1443823 (EP02774763.3) dated May 17, 2010.

Richard W. Hartel, Crystallization, In Handbook of Industrial Crystallization (2002) Myerson AS Butterworth-Heinemann Chapter 13; p. 287-204; See Sections 13.3 and 13.2.1 at pp. 293 and 290.

Van Hook, et al., Nucleation and Growth in Sucrose Solutions, Royal Society Chemistry (1949) vol. 5, p. 112-117, See p. 114.

A. G. Walton, Nucleation in Liquids and Solution, In Nucleation, Zettlemayer, A.C., (Ed), Marcel Dekka NY (1969) p. 225-308; See pp. 247, 252, 302.

H.A. Leniger (Ed.), Food Process Engineering, Kluwer Academic Publishers Crystallization (1975), Section 4.3.5, p. 531-540; See p. 531.

* cited by examiner

US 7,910,149 B2

LIQUID BREAD IMPROVER, THE USE AND THE PROCESS FOR PRODUCING THEREOF

CROSS REFERENCE TO RELATED APPLICATIONS

This application is a continuation-in-part of International Application No. PCT/EP02/12227, filed Nov. 1, 2002, and claims foreign priority of Finnish Application No. 20012151, filed Nov. 5, 2001.

BACKGROUND OF THE INVENTION

The present invention relates to a water-free low viscous liquid bread improver, which comprises a liquid emulsifier, a glyceride based stabilizer and additive(s) and less than about 20% oil, and to a process for producing a liquid bread improver. The liquid bread improver according to the present invention may be used in e.g. a variety of products in bakery industry or in extruded snacks.

Bread improvers are widely used in the bakery industry. Bread improvers are compositions containing a variety of ingredients, which improve dough properties and quality of bakery products, e.g. bread and cakes. Bread improvers affect e.g. the dough stability and the bread texture and volume. Bread improvers usually contain fats and oils as well as additives like emulsifiers, enzymes, antioxidants, oxidants, stabilizers and reducing agents.

Liquid bread improvers are often preferred nowadays because they are easy to handle and mix with other ingredients. Liquid bread improvers are dustless, thus there is no risk of allergenic reactions of the workers in the bakery caused by e.g. enzymes. They are pumpable, which reduce the amount of labour needed. They enhance the distribution of functional ingredients in the dough and allow a lower cost in use. A liquid bread improver is easy to handle and it enables accurate dosing of the amount of the bread improver. Liquid bread improvers made with current technology are made by mixing emulsifiers with large amount of oils to decrease the viscosity of the emulsifiers in order to allow the improvers to be fluid enough to be pumped.

EP 0 572 051 discloses a liquid bread-improver composition comprising 75-95 wt. % a vegetable oil having $N_{20}$<2.0, 1-5 wt. % a hydrogenated and a partly hydrogenated vegetable oil as well as emulsifiers, flavours, bread-improving enzymes and oxidants.

EP 0 421 510 discloses a flowable, fat-containing bread-improver composition comprising a mixture of fat and additives, including solids, whereby solid fat particles together with solid additive particles are dispersed in a liquid glyceride oil. The oil content of the compositions in the examples is more than 45%. The dispersion according to the invention contains more than 18 wt. % of the total solid particles.

WO01/70036 discloses a liquid bread improver in the form of an improving agent in an oily vehicle and a fumed silica stabilizing agent.

WO01/11974 discloses a liquid bread improver comprising 30 to 70 wt. % a vegetable triglyceride oil, 2.5 to 15 wt. % fat and/or emulsifier, 0.05 to 5 wt % enzyme particles and 5 to 50 wt. % other bread improving ingredients.

U.S. Pat. No. 4,477,479 relates to liquid dough conditioners for bakery goods which conditioners comprise about 10 to about 90 weight % of diacetyl tartaric acid esters of diglycerides, about 6 to about 86 weight % glycerides, and about 4 to about 12 weight % either lactic acid or an acyl lactylic acid. In the invention in question lactic acid or an acyl lactylic acid is added as a clarifying agent.

The prior art does not disclose any water-free low viscous liquid bread improvers containing liquid emulsifiers which contain only little, i.e. less than about 20% oil. It has not been possible to produce liquid bread improvers containing liquid emulsifiers with such a low amount of oil and no water and still having a low enough viscosity to be pumped.

The liquid bread improvers containing large amounts of oil cannot be used in all types of recipes for example used for baking bread. Presence of oil may cause unwanted texture characteristics to some products, such as low volume of the bread, problems with sliceability, a too tight texture. Oil may also have an unwanted effect on the taste and lower the healthiness of the product.

The production process normally used to produce conventional liquid bread improvers requires several process steps in order to give a homogeneous product, which is stable during storage. The process covers the following steps: fat, oil and emulsifiers should be heated in order to give a uniform mixture. This mixture then has to be chilled and then rested for several hours. After the resting period additives, such enzymes, emulsifiers and ascorbic acid are added during agitation. This process makes it necessary for the liquid bread improver producer to have special equipment, such as a tube chiller. Additionally it is necessary to have large buffer tanks to keep the improver for the resting period. Thus, there are major investments needed before liquid bread improver producers are able to begin actual production with the current technology. Thus, it is not profitable for small bread improver producers to change the production from powdered improvers to liquid bread improvers.

Through a research and a development process, it has now been found that it is possible to prepare a water-free low viscous liquid bread improver containing liquid emulsifier containing less than 20% oil in a process, which is simple and technically advantageous. This is possible because the liquid emulsifier used has a low viscosity at ambient temperature. This low viscosity of the liquid emulsifier ensures that the final improver remains liquid and thus pumpable. In the present invention the liquid bread improver with less than 20% oil is capable of sustaining a stable and low viscous dispersion with up to 30% solid additives.

When the bread improver of the present invention is composed of only liquid emulsifier based on esters of hydroxy polycarbocylic acid derivatives and glyceride based stabilizer the mixture can be produced through the same process steps as described for the production of liquid improvers above. This process should be performed by a company, which has the needed equipment for the producing liquid improvers as stated above. This mixture can then be sold to smaller producers, which would like to produce liquid bread improvers, but do not find it profitable with the current technology due to the mentioned needed investments. These producers would then only need to add the appropriate additives to the mixture of the liquid emulsifier and glyceride based stabilizer and agitate for few minutes in order to produce a liquid bread improver. Thus, these producers' investments in order to produce liquid bread improvers will be much smaller, since they do not need special heating and cooling equipment.

DETAILED DESCRIPTION OF THE INVENTION

The water-free low viscous liquid bread improver according to the present invention comprises a liquid emulsifier based on esters of hydroxy polycarbocylic acid derivatives, a glyceride based stabilizer and additive(s) and less than about 20% oil. The process according to the invention enables the production of a water-free low viscous liquid bread improver, which contains only little oil or no oil at all. The liquid bread improver and the process for producing thereof are defined in the appended claims.

The bread improver according to the present invention contains less than about 20% oil and no water, but it is still in a liquid form. This enables the use of the liquid bread improver also in recipes where it has not been possible to use the prior art liquid bread improvers, since they contain disadvantageous amounts of oil. A liquid bread improver according to the present invention can be used in smaller amounts than conventional bread improvers, because it is a more concentrated product.

The process according to the invention enables easy preparation of liquid bread improvers. The production of a water-free low viscous liquid bread improver according to the present invention does not require special equipment. A liquid improver according to the present invention has such a low viscosity that it is possible also for small producers to add their own additives, like antioxidants, enzymes and flavourings, to the liquid bread improver.

A water-free low viscous liquid bread improver according to the invention comprises a low viscosity, liquid emulsifier based on esters of hydroxy polycarboxylic acid derivatives. a glyceride based stabilizer and additive(s). The liquid bread improver preferably comprises about 50% to about 98% emulsifier, about 2 to about 10% stabilizer, 0 to about 30% additives and 0 to about 20% oil. A preferred liquid bread improver according to the invention comprises less than about 15%, more preferably less than about 10%, most preferably less than about 1% oil.

The present liquid bread improver is a stable low viscous dispersion of a variety of solid additives, which is easy to pump even when the content of the solid additives is about 30%. In case of using solid additives, the product is not clear; on the contrary it may be very cloudy or even completely non-transparent. However, the clarity of the product is not an issue in the present invention and it is not a fundamental property of the product.

The term "bread" is not meant to restrict the product to be used merely in bread, but it is used in order to define that improvers according to the present invention are usually used in a variety of bakery products. A liquid bread improver according to the present invention is a composition used in for example breads and other cereal products in order to improve the quality of the product. They can also be used in production of e.g., puff pastry, biscuits, extruded snacks and sweet fermented dough.

The term "liquid" means that the composition has a viscosity low enough below 50,000 cP at ambient temperature to enable e.g. pumping of the composition at room temperature. The composition has preferably a viscosity below about 30,000 cP, more preferably below about 15,000 cP at ambient temperature.

The term "water-free" means that the liquid bread improver of the present invention does not contain water.

The term "low viscous" means that the viscosity of the product at room temperature is so low that it is possible to pump the product from one place to another.

The term "low viscosity" means that the low viscosity liquid emulsifier has a viscosity below 20,000 cP at ambient temperature. The emulsifier preferably has a viscosity below about 10,000 cP, more preferably below about 5,000 cP at ambient temperature. The low viscosity emulsifier most preferably has an even lower viscosity, i.e. a viscosity below 2,000 cP such as about 1,500 cP.

Emulsifiers are molecules which have both a hydrophobic end and a hydrophilic end enabling mixing of lipids and water into an emulsion that does not separate. In baking emulsifiers reduce dough stickiness and improve dough tolerance towards variations in flour quality and improve handling of the dough. They improve final bread volume, crumb softness and texture. Emulsifiers can also improve the distribution of oil and fat.

Emulsifiers are usually produced from vegetable oils, animal fat and glycerol. Emulsifiers of the present invention are based on esters of hydroxy polycarboxylic acid derivatives, preferably esters of diacetyltartaric acid and citric acid. Emulsifiers used in the present invention are preferably fat based, more preferably vegetable fat based. Also emulsifiers produced from organic acids like fatty acids and lactic, citric, acetic and tartaric acids in combination with fat, glycerol, sorbitol and propylene glycol are suitable for the liquid bread improver according to the present invention.

An especially preferred emulsifier used in the present invention comprises diacetyl tartaric acid esters of mono- and/or diglycerides. Diacetyl tartaric acid esters of diglycerides and mixtures of mono- and diglycerides are often used in ionic emulsifiers which are especially suitable for strengthening a gluten network in dough. A stronger gluten network is better at retaining carbon dioxide produced by the yeast.

Stabilizers used in the present invention are glyceride based, preferably vegetable glyceride based. A powdered stabilizer is also suitable for the present invention. Stabilizers are special ingredients used in bread improvers with emulsifiers in order to make the bread improvers stable. Stabilizers ensure homogenous distribution and consistency of the improver. Stabilizers prevent e.g. sedimentation of the additives in the mixture and make sure that the mixture remains even. Many emulsifiers may be used as stabilizers as well.

The term "fat based" means that the emulsifiers used in the present invention are made from fats. A fat based emulsifier or stabilizer may as such contain fat derived from different sources of vegetable or animal origin.

Fats are fatty acid esters of glycerol. Fats are called mono-, di- or triglycerides depending on the number of fatty acids on the glycerol backbone. The hardness of the fats depends on the degree of unsaturation of the fatty acids. A high degree of unsaturation causes softness of the fat. Fats with high degree of unsaturation are also called oils, whereas more saturated fats are solid at room temperature.

Hydrogenation changes the degree of saturation by reaction with the double bonds. The melting point of the oil is increased and at some degree the oil changes into fat, which is solid at room temperature. Partially hydrogenated fat contains some unsaturated fatty acids.

Animal fats have a high content of saturated fatty acids and they are mostly solid at room temperature. Vegetable and fish fat, on the other hand, have a high content of unsaturated fat, which make them liquid at room temperature. An exception to this is e.g. cocoa butter, a vegetable fat which is solid at room temperature.

The fat based components of the present invention are preferably derived from fats of vegetable origin. Vegetable fats are preferably derived from e.g. rapeseed, sunflower, soybean, maize (corn), peanut, cottonseed, safflower, olive, coconut, palm, palm kernel, babassau and cocoa.

The term "glyceride based" means that the stabilizers used in the present invention are made from glycerides. A glyceride based stabilizer may as such contain glycerides derived from different sources of vegetable or animal origin such as rapeseed, sunflower, soybean, maize (corn), peanut, cottonseed, safflower, olive, coconut, palm, palm kernel, babassu, cocoa, tallow, lard, chicken fat and butteroil.

The term "additive" means ingredients included in bread improvers in order to improve the quality of bakery products. Additives are preferably antioxidants, oxidants, reducing agents, enzymes, flavourings, hydrocolloids and/or soy flour.

Preferable antioxidants in a water-free low viscous liquid bread improver according to the present invention are ascorbic acid, tocopherol, ascorbyl palmitate, gallate TBHG, BHT or BHA. Antioxidants containing ascorbyl palmitate, tocopherol and citric acid esters of mono- and diglycerides of fatty acids are especially preferable in the present invention. The amount of the ascorbic acid in the liquid bread improver according to the present invention is preferably less than about 10%, more preferably less about 7%, most preferably less than about 5%. The amount of the other antioxidants in the liquid bread improver according to the present invention is preferably less than about 2%, more preferably less about 1%, most preferably less than about 0.5%.

Preferable oxidants in a liquid bread improver according to the present invention are potassium perchlorate, potassium bromate, potassium iodate, ascorbic acid, azodicarbonamide, various organic and inorganic peroxides including hydrogen peroxide.

Preferable reducing agents in a liquid bread improver according to the present invention are L-cystein, sodium metabisulfite (SMS) and deactived yeast. The dosage ranger are less than 20%, preferably less than 10%, most preferably less than 5%.

Any enzymes used in bakery industry can be used in the bread improvers according to the present invention. Enzymes used in the present invention are preferably amylases, hemicellulases, amylolytic complexes, lipases, proteases, xylanases, pectinases, pullulanases, non starch polysaccharide degrading enzymes and redox enzymes like glucose oxidase, lipoxygenase or ascorbic acid oxidase. Enzymes used it the liquid bread improvers according to the present invention improve the quality of breads and cakes by e.g. giving more volume, better crumb structure or an improved crust colour. The amount of the enzymes in the liquid bread improver according to the present invention is preferably less than about 15%, more preferably less about 10%, most preferably less than about 5%.

Flavourings may be also included in the bread improvers according to the present invention. Flavourings used may be any conventional flavourings used in the bakery industry. The amount of the flavourings in the liquid bread improver according to the present invention is preferably less than about 30%.

A preferred water-free low viscous liquid bread improver according to the invention comprises a liquid emulsifier comprising diacetyl tartaric esters of mono- and/or diglycerides, a stabilizer comprising vegetable glycerides and additives, such as enzymes, antioxidants, oxidants, reducing agents, flavourings, emulsifiers, hydrocolloids and soy flour. An especially preferred additive is an antioxidant.

An preferred water-free low viscous liquid bread improver according to the present invention contains 94 to 98%, more preferably 97 to 98% low viscosity emulsifier, 2 to 6%, more preferably 2 to 2.5% stabilizer and 0 to 0.1% antioxidant. An especially preferred liquid bread improver according to the present invention contains 97.95% low viscosity emulsifier, 2% stabilizer and 0.05% antioxidant. An especially preferred emulsifier contains diacetyl tartaric esters of mono- and/or diglycerides.

Yet another preferred a liquid bread improver according to the present invention comprises 85 to 90%, more preferably 89 to 90% low viscosity emulsifier, 2 to 6%, more preferably 3 to 4% stabilizer, 0 to 0.1%, mote preferably 0.05% antioxidant, 1 to 5% enzyme, more preferably 4 to 5% enzyme and 1 to 3%, more preferably 2.00% ascorbic acid. An especially preferred liquid bread improver comprises 89.95% low viscosity emulsifier, 3.00% stabilizer, 0.05% antioxidant, 5.00% enzyme and 2.00% ascorbic acid.

A water-free low viscous liquid bread improver according to the present invention may be used in a variety of products. Bakery products are preferred, especially breads, rolls, puff pastries, sweet fermented doughs, cakes, crackers, cookies, biscuits, waffles, wafers, tortillas, breakfast cereals, extruded products, as well as use of the liquid bread improver in coffee whiteners. A liquid bread improver according to the present invention can be also used in combination with oil.

A process for producing a water-free low viscous liquid bread improver according to the invention comprises the steps of mixing the liquid emulsifier based on esters of hydroxy polycarboxylic acid derivatives and the stabilizer and heating to 50 to 90° C. These components are mixed into an even mixture. In case additives requiring an elevated mixing temperature are used, they are added into the mixture of the emulsifier and the stabilizer. The obtained mixture is cooled to 5 to 35° C. and stirred thoroughly to provide a homogenous mixture. In case additives which require a low mixing temperature are used, they are then added and mixed into the cooled homogenous mixture. This procedure provided a low viscosity liquid bread improver.

In a preferred process the cooling is performed with a tube chiller.

The equipment used in the process may be any conventional equipment used for mixing of bread improvers. The additives, which need an elevated temperature when added into the mixture, may be e.g. antioxidants. They are added before the cooling of the mixture. Additives like enzymes do not endure elevated temperatures and they are added to the cooled mixture.

In a preferred embodiment the emulsifier and the stabilizer are mixed and heated to 60 to 75° C. to melt the stabilizer. The temperature is lowered to 55 to 65° C. and the additives, which require an elevated temperature at mixing, are added. The mixture is cooled in a tube chiller to a temperature of 5 to 15° C. The liquid shortening is pumped into a tank and stirred slowly for at least two hours at ambient temperature to form a crystal network. The mixture is agitated with a propeller to allow the pumpability of the product. The additives like enzymes requiring a low temperature at mixing are added and mixed into the mixture.

In a further embodiment, (FE), the water-free low viscous liquid bread improver is characterized in that the liquid bread improver comprises 50% to 98% of a liquid emulsifier based on esters of hydroxy polycarboxylic acid derivatives, a glyceride based stabilizer, optional additive(s) and less than 20% oil, and said liquid bread improver lacks a clarifying amount of lactic acid or an acyl lactylic acid. In alternative embodiments of embodiment 'FE,' the water-free low viscous bread improver is characterized in that:

(A) the clarifying amount is about 4 to about 12 weight % of lactic acid or an acyl lactylic acid;

(B) the water-free low viscous bread improver comprises about 2 to about 10% stabilizer, 0 to about 30% additives and 0 to about 20% oil;

(C) the water-free low viscous bread improver comprises less than about 15%, more preferably less than about 10%, most preferably less than about 1% oil;

(D) the water-free low viscous bread improver comprises 94 to 98% liquid emulsifier, 2 to 6% stabilizer and 0 to 0.1% antioxidant;

(E) the water-free low viscous bread improver comprises 97 to 98% liquid emulsifier, 2 to 2.5% stabilizer and 0 to 0.1% antioxidant;

(F) the water-free low viscous bread improver consists of esters of hydroxy polycarboxylic acid derivatives and glyceride based stabilizer; or (F1) in an alternative embodiment of embodiment 'F', the water-free low viscous bread improver consists of 94 to 98% esters of hydroxy polycarboxylic acid derivatives and 2 to 6% stabilizer;

(G) the emulsifier is fat based; or (G1) in an alternative embodiment of embodiment 'G', the emulsifier comprises vegetable fat;

(H) the emulsifier comprises diacetyl tartaric esters of mono and diglycerides;

(I) the emulsifier has a viscosity of below about 20,000 cP, preferably below about 10,000 cP, more preferably below about 5,000 cP, most preferably below about 2,000 cP at ambient temperature;

(J) the stabilizer comprises vegetable glyceride;

(K) the stabilizer is in a powdered form;

(L) the emulsifier comprises diacetyl tartaric esters of mono- and/or diglycerides, a stabilizer comprising vegetable glyceride and additive(s), selected from enzymes, antioxidants, oxidants, flavorings, emulsifiers, hydrocolloids and soy flour; (L1) in a further alternative embodiment of embodiment 'L', the additive is an antioxidant; or (M) the water-free low viscous bread improver comprises 85 to 90%, more preferably 89 to 90% low viscosity emulsifier, 2 to 6%, more preferably 3 to 4% stabilizer, 0 to 0.1%, more preferably 0.05% antioxidant, 1 to 5% enzyme, more preferably 4 to 5% enzyme and 1 to 3%, more preferably 2.00% ascorbic acid.

In a further alternative embodiment, (N), of embodiments FE, A, B, C, D, E, G, G1, H, I, J, and K as described above, the additive(s) is selected from antioxidant(s), oxidant(s), reducing agent(s), enzyme(s), flavouring(s), hydrocolloids, emulsifiers and/or soy flour. In alternative embodiments of embodiment 'N':

(N1) the antioxidant is selected from ascorbic acid, tocopherol, ascorbyl palmitate, gallate, TBHG, BHT and BHA;

(N2) the antioxidant contains ascorbyl palmitate, tocopherol and/or citric acid esters of mono- and/or diglycerides of fatty acids;

(N3) the oxidant is selected from potassium perchlorate, potassium bromate, potassium iodate, ascorbic acid, azodicarbonamide, various organic and inorganic peroxides including hydrogen peroxide;

(N4) the reducing agent(s) are selected from L-cystein, sodium metabisulfite (SMS) and deactivated yeast; or (N5) the enzyme is selected from amylase, hemicellulase, amylolytic complexes, lipase, protease, xylanase, pectinase, pullulanase, non starch polysaccharide degrading enzymes, redox enzymes, such as glucose oxidase, lipoxygenase and ascorbic acid oxidase.

The invention is also directed to use of a water-free low viscous liquid bread improver comprising 50% to 98% of a liquid emulsifier based on esters of hydroxy polycarboxylic acid derivatives, a glyceride based stabilizer, optional additive(s) and less than 20% oil, which liquid bread improver lacks a clarifying amount of lactic acid or an acyl lactylic acid, in breads, rolls, puff pastries, sweet fermented doughs, cakes, crackers, cookies, biscuits, waffles, wafers, tortillas, breakfast cereals, extruded products or coffee whiteners.

The invention is also directed to a process for producing a water-free low viscous liquid bread improver comprising 50% to 98% of a liquid emulsifier based on esters of hydroxy polycarboxylic acid derivatives, a glyceride based stabilizer, optional additive(s) and less than 20% oil, the liquid bread improver lacking a clarifying amount of lactic acid or an acyl lactylic acid, comprising the steps of: (a) mixing said liquid emulsifier and said stabilizer and heating to 50 to 90° C., (b) optionally adding additives requiring an elevated mixing temperature into the mixture of emulsifier and stabilizer, (c) cooling the obtained mixture to 5 to 35° C. and stirring the mixture thoroughly to provide a homogenous mixture, and (d) optionally adding and mixing additives requiring a low mixing temperature into said mixture, to provide a low viscous liquid bread improver. In an alternative embodiment of this process, the cooling can be performed with a tube chiller.

The invention is also directed to a water-free low viscous liquid bread improver characterized in that the liquid bread improver comprises 94 to 98% of a liquid emulsifier based on esters of hydroxy polycarboxylic acid derivatives and 2 to 6% of a glyceride based stabilizer. Alternatively, this embodiment can be characterized in that the liquid bread improver comprises 97 to 98% of a liquid emulsifier and 2 to 2.5% of a stabilizer. Alternatively, either of these embodiments can be characterized in that the liquid bread improver further comprises 0 to 0.1% of an antioxidant.

The invention is now illustrated with a few examples.

EXAMPLES

EXAMPLE 1a

A liquid bread improver comprising 97.95% emulsifier (PANODAM™ VISCO-LO produced by Danisco A/S), 2.00% stabilizer (GRINSTED™ PS 209 produced by Danisco A/S) and 0.05% antioxidant (GRINDOX™ 1021 produced by Danisco A/S) was produced.

The emulsifier and the stabilizer were mixed and heated to 65 to 70° C. to melt the stabilizer. The temperature was lowered to 60 to 65° C. and the antioxidant was added. The mixture was cooled and crystallized in a tube chiller at normal capacity and intensive cooling with product outlet temperature of 5 to 10° C. The liquid shortening was pumped into a tank and stirred slowly for at least two hours at ambient temperature. The mixture was finally agitated with a propeller to allow the pumpability of the product.

EXAMPLE 1b

The liquid bread improver from example 1a was added 3% ascorbic acid and 6% enzyme (GRINDAMYL™ produced by Danisco A/S). The mixture was agitated for 5 minutes with a propeller.

EXAMPLE 2

A liquid bread improver comprising 89.95% emulsifier (PANODAN™ VISCO-LO produced by Danisco A/S), 3.00% stabilizer (GRINSTED™ PS 209 produced by Danisco A/S) and 0.05% antioxidant. (GRINDOX™ 1021 produced by Danisco A/S), 5.00% enzyme (GRINDAMYL™ S 200 produced by Danisco A/S) and 2.00% ascorbic acid was produced.

The emulsifier and the stabilizer were mixed and heated to 65 to 70° C. to melt the stabilizer. The temperature was lowered to 60 to 65° C. and the antioxidant was added. The mixture was cooled and crystallized in a tube chiller at normal capacity and intensive cooling with product outlet temperature of 5 to 10° C. The liquid shortening was pumped into a tank and stirred slowly for at least two hours at ambient temperature. The mixture was agitated with a propeller to allow the pumpability of the product. The enzyme and the ascorbic acid were added.

EXAMPLE 3

The liquid bread improver from Example 2 was tested in baking a toast bread produced with the Chorleywood mixing procedure.

3000 g flour, 60 g salt, 120 g compressed yeast, 15 g fat (35° C. melting point), 600 BU water and 7.5 g the liquid bread improver from Example 2 were mixed in a Tweedy mixer with 55 W using 40 cm Hg vacuum. The dough temperature was 29° C. The dough was allowed to rest 5 minutes at room temperature in tea towel. The dough was moulded with a Glimek moulder starting from top handle 1:4, 2:3, 3:16 and 4:15. The dough was proofed in a Lilinord proofing cabinet for 55 minutes at 43° C. and 70% RH.

The toast bread was baked in a Bago oven at 220° C. for 35 minutes and 5 minutes with the register open.

The toast bread had a good texture and volume.

EXAMPLE 4

The liquid bread improver from Example 2 was tested in baking hard rolls.

2000 g flour, 120 g compressed yeast, 32 g salt, 32 g sugar, 400 BU water and 6 g the liquid bread improver from Example 2 were mixed in a Hobart mixer with a hook. The ingredients were mixed 2 minutes at the $1^{st}$ speed, scraped down and then 9 minutes at the $2^{nd}$ speed. The dough temperature was 26° C. The dough was allowed to rest 10 minutes at 30° C. wrapped in tea towel in a heating cabinet. The dough was moulded with a Fortuna moulder. The dough was proofed for 45 minutes at 34° C. and 85 RH.

The hard rolls were baked in a Bago oven at 220° C. for 18 minutes.

The hard rolls had a good texture and volume.

The present invention has been illustrated in detail by the above examples. It is evident to those skilled in the art that the invention may be used in many different ways.

What is claimed is:

1. A water-free bread improver comprising:
   i) a liquid emulsifier based on esters of hydroxy polycarboxylic acid derivatives having a viscosity of below about 2,000 cP at ambient temperature;
   ii) a glyceride based stabiliser; and
   iii) less than about 20% oil.

2. A bread improver according to claim 1 wherein said liquid emulsifier based on esters of hydroxy polycarboxylic acid derivatives has a viscosity of about 1,500 cP at ambient temperature.

3. A bread improver according to claim 1 wherein said liquid emulsifier comprises diacetyl tartaric esters of mono- and diglycerides.

4. A bread improver according to claim 1 wherein said liquid emulsifier consists of diacetyl tartaric esters of mono- and diglycerides.

5. A bread improver according to claim 1 comprising less than 10% oil.

6. A bread improver according to claim 1 comprising less than 1% oil.

7. A bread improver according to claim 1 comprising:
   i) 94 to 98% emulsifier;
   ii) 2 to 6% stabiliser; and
   iii) 0 to 0.1% antioxidant.

8. A water-free liquid bread improver composition comprising:
   i) a liquid emulsifier based on esters of hydroxy polycarboxylic acid derivatives having a viscosity of below about 2,000 cP at ambient temperature;
   ii) a glyceride based stabiliser;
   iii) less than about 20% oil; and
   iv) up to 30% solid additives.

9. A bread improver composition according to claim 8 wherein the additives comprise one or more additives selected from the group consisting of:
   i) antioxidants;
   ii) oxidants;
   iii) reducing agents;
   iv) enzymes;
   v) flavourings;
   vi) hydrocolloids; and
   vii) soy flour.

10. A bread improver composition according to claim 8 wherein said additives comprise enzymes.

11. A bread improver composition according to claim 10 wherein said enzymes include one or more enzymes selected from the group consisting of:
   i) amylases;
   Ii) hemicellulases;
   iii) amylolytic complexes;
   iv) lipases;
   v) proteases:
   vi) xylanases:
   vii) pectinases;
   viii) pullulanases:
   ix) non starch polysaccharide degrading enzymes; and
   x) redox enzymes.

12. A bread improver composition according to claim 8 comprising:
   i) 85 to 90% of a liquid emulsifier based on esters of hydroxy polycarboxylic acid derivatives having a viscosity of below about 2,000 cP at ambient temperature;
   ii) 2 to 6% of a glyceride based stabiliser;
   iii) 0 to 0.1% antioxidant;
   iv) 1 to 5% enzyme; and
   v) 1 to 3% ascorbic acid.

13. A bakery product comprising a bread improver according to claim 1 or a bread improver composition according to claim 8.

14. A bakery product according to claim 13 selected from the group consisting of:
   i) breads;
   ii) rolls;
   iii) puff pastries;
   iv) sweet fermented doughs;
   v) cakes;
   vi) crackers;
   vii) cookies;
   viii) biscuits;
   ix) waffles;
   x) wafers;
   xi) tortillas;
   xii) breakfast cereals; and
   xiii) extruded products.

15. A process for the preparation of a water-free liquid bread improver as claimed in claim 1 or a water-free liquid bread improver composition as claimed in claim 8 comprising the steps of:

i) mixing a liquid emulsifier and a stabilizer;

ii) heating to 50 to 90° C.;

iii) optionally adding additives into the emulsifier and stabilizer;

iv) cooling to 5 to 35° C. and stirring to provide a homogenous mixture; and v) optionally adding and mixing further additives.

\* \* \* \* \*